United States Patent
Kim et al.

(10) Patent No.: US 10,160,384 B2
(45) Date of Patent: Dec. 25, 2018

(54) MIRROR ACTUATOR FOR VEHICLE

(71) Applicants: HYUNDAI MOTOR COMPANY, Seoul (KR); KIA MOTORS CORPORATION, Seoul (KR); KDS Co., Ltd., Gyeongsan-si, Gyeongsangbuk-do (KR); S L Mirrortech Corporation, Siheung-si, Gyeonggi-do (KR)

(72) Inventors: Hyun Sub Kim, Seoul (KR); Nak Kyoung Kong, Seongnam-si (KR); Young Sub Oh, Suwon-si (KR); Jin Hee Lee, Seoul (KR); Seung Won Yang, Gyeongsan-si (KR); Young Kook Cho, Gyeongsan-si (KR)

(73) Assignees: HYUNDAI MOTOR COMPANY, Seoul (KR); KIA MOTORS CORPORATION, Seoul (KR); KDS Co., Ltd., Gyeongsan-si, Gyeongsangbuk-do (KR); S L Mirrortech Corporation, Siheung-si, Gyeonggi-do (KR)

( * ) Notice: Subject to any disclaimer, the term of this patent is extended or adjusted under 35 U.S.C. 154(b) by 456 days.

(21) Appl. No.: 14/872,977

(22) Filed: Oct. 1, 2015

(65) Prior Publication Data
US 2016/0144790 A1 May 26, 2016

(30) Foreign Application Priority Data

Nov. 24, 2014 (KR) ........................ 10-2014-0164209

(51) Int. Cl.
*B60R 1/066* (2006.01)
*B60R 1/072* (2006.01)

(52) U.S. Cl.
CPC .................................... *B60R 1/072* (2013.01)

(58) Field of Classification Search
CPC ........... B60R 1/064; B60R 1/066; B60R 1/07; B60R 1/072
See application file for complete search history.

(56) References Cited

U.S. PATENT DOCUMENTS 8,246,266 B2 * 8/2012 Lang ....................... B60R 1/066
359/874
8,622,559 B2 * 1/2014 Caballero Tapia ..... B60R 1/072
359/844

(Continued)

FOREIGN PATENT DOCUMENTS

| DE | 199 19 528 | * 11/2000 | ............. B60R 1/06 |
| JP | 2012-232734 | * 11/2012 | ............ B60R 1/072 |
| KR | 10-1997-0038164 A | 7/1997 | |

(Continued)

*Primary Examiner* — Michael P Ferguson
(74) *Attorney, Agent, or Firm* — McDermott Will & Emery LLP

(57) ABSTRACT

A mirror actuator for a vehicle includes a housing and a cover disposed, when the mirror actuator is assembled, at an upper side of the housing. The cover has a cover rail formed therein. An adapter plate has a rotatable shaft which, when the mirror actuator is assembled, is seated on the cover rail and rotatable around a first axis of rotation. A pivot clip, when assembled to the cover, is rotatable around a second axis of rotation, surrounds the rotatable shaft, and affixes the adapter plate on the cover rail.

3 Claims, 5 Drawing Sheets

(56) References Cited

U.S. PATENT DOCUMENTS

2005/0128612 A1\* 6/2005 Ro .......................... B60R 1/072
　　　　　　　　　　　　　　　　　　　　359/879
2011/0228412 A1　　9/2011　Sakata

FOREIGN PATENT DOCUMENTS

| KR | 2003-0057232 A | 7/2003 |
| KR | 10-2009-0128205 A | 12/2009 |
| KR | 20-0469818 Y1 | 11/2013 |
| KR | 20-0471924 Y1 | 3/2014 |

\* cited by examiner

MIRROR ACTUATOR FOR VEHICLE

CROSS-REFERENCE TO RELATED APPLICATION

This application claims under 35 U.S.C. § 119(a) the benefit of priority to Korean Patent Application No. 10-2014-0164209 filed on Nov. 24, 2014, the entire contents of which are incorporated herein by reference.

TECHNICAL FIELD

The present disclosure relates to a mirror actuator for a vehicle. More particularly, it relates to a mirror actuator that is used to adjust an inclination angle of a side view mirror or a rear view mirror for a vehicle.

BACKGROUND

In general, a vehicle is provided with a rear view mirror and side view mirrors for ensuring rearward visibility when a vehicle travels, and inclination angles of the rear view mirror and the side view mirrors need to be appropriately adjusted in order to ensure visibility for a driver.

Recently, drivers have preferred an electric mirror of which the inclination angle (posture) may be conveniently adjusted by manipulating buttons rather than a manual mirror of which the inclination angle is adjusted by hand, and the electric mirror requires a mirror actuator for adjusting a posture of the rear view mirror and the side view mirror.

A mirror actuator in the related art includes a housing which accommodates a motor and gears, and an adapter plate which is disposed at an upper side of the housing and rotated relative to the housing by operations of the motor and the gears.

The adapter plate is attached to the side view mirror so as to support the rotation of the side view mirror, and rotates the side view mirror while being rotated by the operations of the motor and the gears, thereby changing the inclination angle of the side view mirror.

An adapter plate 1 in the related art is rotatably fixed at an upper side of a housing (not illustrated). Referring to FIG. 7, a pivot retainer 2 is assembled in a spherical space at a central portion of the adapter plate 1 so as to be rotatable about one axis based on a single axis, a pivot sleeve 3 is assembled to a rotatable shaft of the pivot retainer 2 so as to be rotatable about two axes at a right angle to the rotatable shaft, and in this case, a plate spring 4 and a screw 5 are used to fix the pivot retainer 2 and the pivot sleeve 3.

However, in the mirror actuator in the related art, there are problems in that time required to assemble the mirror actuator is increased because components, which are used to assemble the adapter plate at the upper side of the housing, are assembled in a stacked manner, and vibration is caused by both of the mirror actuator and the plate spring when the mirror actuator and the plate spring are operated to rotate the side view mirror because an assembled structure using the plate spring is affected by the spring constant.

The above information disclosed in this Background section is only for enhancement of understanding of the background of the inventive concept and therefore it may contain information that does not form the prior art that is already known in this country to a person of ordinary skill in the art.

SUMMARY

The present disclosure has been made in an effort to solve the above-described problems associated with prior art and to provide a mirror actuator for a vehicle, which is capable of reducing the number of components to be assembled and reducing assembling time by improving an assembled structure of an adapter plate that is configured to be rotatable in different axial directions at an upper side of a housing.

In one aspect, an embodiment of the present invention provides a mirror actuator for a vehicle, including: a housing, and a cover disposed, when the mirror actuator is assembled, at an upper side of the housing. The cover has a cover rail formed therein. An adapter plate has a rotatable shaft which, when the mirror actuator is assembled, is seated on the cover rail and rotatable around a first axis of rotation. A pivot clip which, when assembled to the cover, is rotatable around a second axis of rotation, surrounds the rotatable shaft, and affixes the adapter plate on the cover rail.

In an embodiment, the cover may include guide grooves, and the pivot clip may include clip ribs may protruding from two opposite sides of the pivot clip. When the mirror actuator is assembled, the two opposite sides surround the rotatable shaft of the adapter plate and the clip ribs may be inserted into the guide grooves of the cover such that the clip ribs form the second axis of rotation.

In certain embodiments, the adapter plate is rotatable around the second axis of rotation formed by the clip ribs.

In certain embodiments, the first axis of rotation and the second axis of rotation may be substantially orthogonal.

In certain embodiments, the cover rail may be formed at a central portion of the cover, and the rotatable shaft may be formed at a central portion of the adapter plate.

In certain embodiments, the rotatable shaft may have a ball-shaped portion configured to prevent interference with the cover rail when the adapter plate is rotated about the clip ribs. In certain embodiments, the ball-shaped portion may be formed at a substantially central portion of the rotatable shaft.

In comparison with the related art, according to the mirror actuator according to embodiments of the present invention, it is possible to reduce the number of components for assembling the adapter plate disposed at the upper side of the housing, and reduce assembling time. In addition, because components such as a plate spring in the related art, which generates vibration, are not necessary, it is possible to reduce vibration, which is generated when a posture of a side view mirror is adjusted, in comparison with the related art.

Other aspects and embodiments of the invention are discussed infra.

It is understood that the term "vehicle" or "vehicular" or other similar terms as used herein is inclusive of motor vehicles in general such as passenger automobiles including sports utility vehicles SUV, buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g., fuel derived from resources other than petroleum. As referred to herein, a hybrid vehicle is a vehicle that has two or more sources of power, for example both gasoline-powered and electric-powered vehicles.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1:
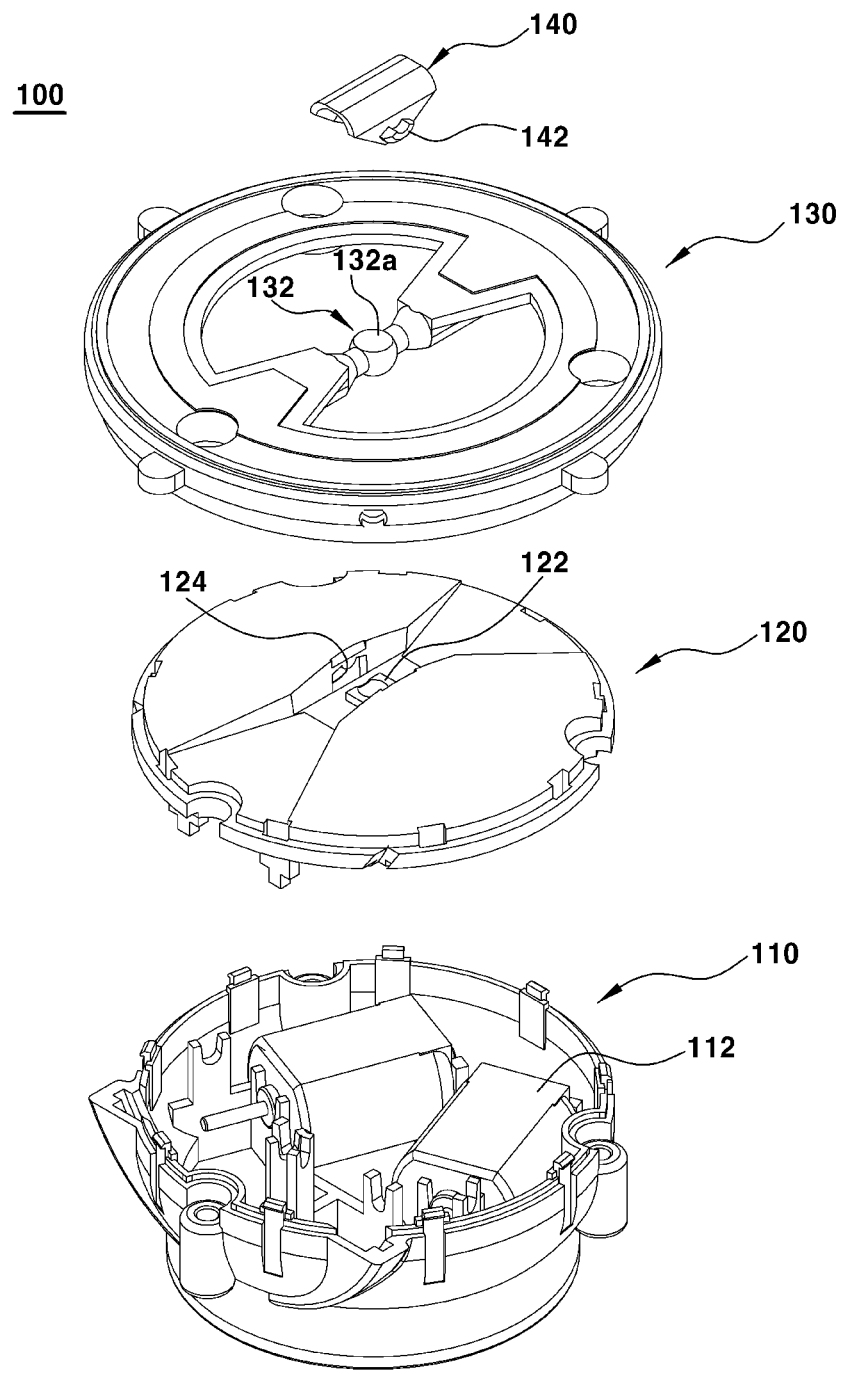
FIG. 1 is an exploded perspective view of a mirror actuator according to an exemplary embodiment of the present invention.
Figure 2:
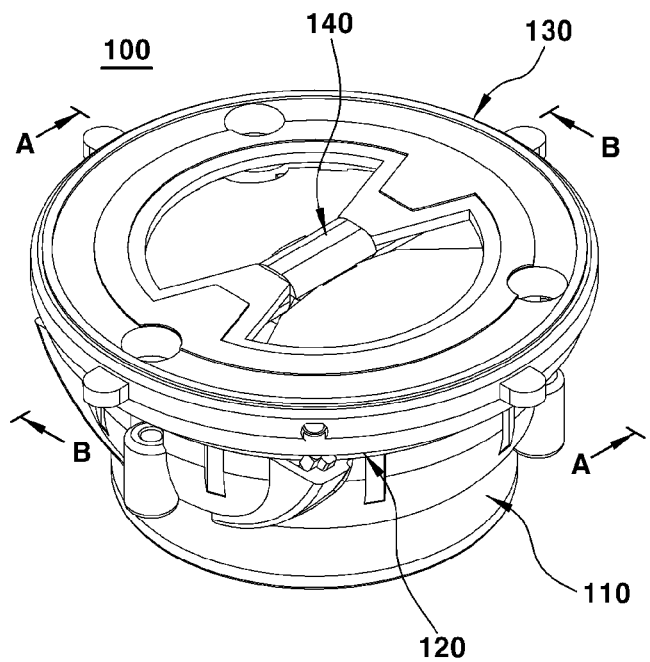
FIG. 2 is a coupled perspective view of the mirror actuator according to the exemplary embodiment of the present invention.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of the disclosed embodiments throughout the several figures of the drawings.

DETAILED DESCRIPTION

Hereinafter, reference will now be made in detail to various embodiments of the present invention, examples of which are illustrated in the accompanying drawings and described below. While embodiments of the invention will be described, it will be understood that the present description is not intended to limit the invention to those exemplary embodiments. On the contrary, the invention is intended to include not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the technical field to which the present invention pertains may easily carry out the exemplary embodiment.

The present disclosure relates to a mirror actuator for changing and adjusting an inclination angle of a side view mirror for a vehicle, and particularly, is characterized by an assembled structure for rotating an adapter plate, which is disposed at an upper end of the mirror actuator, in all directions (in upward and downward directions, and in leftward and rightward directions).

As illustrated in FIGS. 1 to 6, a cover 120, an adapter plate 130, and a pivot clip 140 are disposed at an upper side of a housing 110 of a mirror actuator 100.

In certain embodiments, the housing 110 accommodates a motor 112 that provides power for rotating the adapter plate 130. In addition, in certain embodiments, although not illustrated in the drawings, gears having predetermined structures, which transfer power from the motor 112 to the adapter plate 130, may be provided and fixedly mounted to a vehicle body side.

Here, because the gear structure, which transfers power from the motor 112 disposed in the housing 110 of the mirror actuator 100 to the adapter plate 130, is a publicly known technology, a description thereof will be omitted.

In certain embodiments, the cover 120 is fixedly assembled to an upper portion of the housing 110, and a cover rail 122, which supports a rotatable shaft 132 of the adapter plate 130, is formed in the cover 120. In certain embodiments, the cover rail 122 is formed at a central portion of the cover 120.

In certain embodiments, guide grooves 124, which are disposed at a predetermined interval, are provided in the cover 120 at both sides of the cover rail 122. In certain embodiments, the predetermined interval corresponds to a side thickness of the pivot clip 140.

The guide grooves 124 are portions in which, in certain embodiments, clip ribs 142 (discussed further hereinbelow) are inserted when the pivot clip 140 is assembled to the cover 120. The guide grooves 124 are provided to allow the rotation of the clip ribs 142 in order to ensure a rotational degree of freedom of the adapter plate 130 based on the clip ribs 142.

The rotatable shaft 132 forms a first rotation axis about which the adapter plate 130 rotates. In certain embodiments, the rotatable shaft 132 is formed at a central portion of the adapter plate 130. The pivot clip 140 is assembled to the cover and surrounds the rotatable shaft 132.

When the mirror actuator is assembled, the rotatable shaft 132 is stacked on the cover rail 122 in a state in which the rotatable shaft 132 is seated on the cover rail 122. Further, the pivot clip 140 is stacked on the cover rail 122 in a state in which the pivot clip 140 surrounds the rotatable shaft 132, thereby affixing the adapter plate 130 to the cover 120 when assembled, while allowing the rotation of the adapter plate 130.

In certain embodiments, clip ribs 142 protrude from the two opposing sides of the pivot clip 40 which surround the rotatable shaft 132 when the mirror actuator is assembled. In certain embodiments, when the mirror actuator is assembled, the clip ribs 142 are inserted into the guide grooves 124 of the cover 120, and the pivot clip 140 is assembled to the cover 20 in a state in which the clip ribs 142 are caught by upper ends of the guide grooves 124, thereby affixing the adapter plate 130 to the cover 120.

Figure 3A:
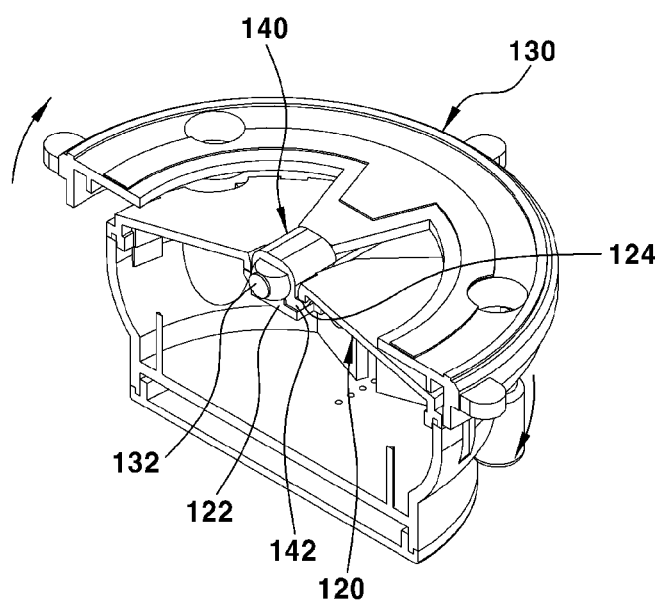
FIGS. 3A and 3B are cut-away perspective views of the mirror actuator according to an exemplary embodiment of the present invention.
Figure 3B:
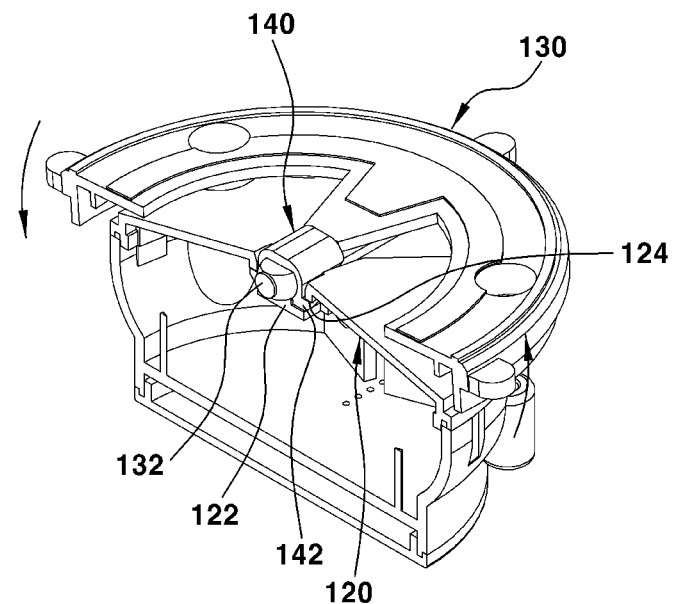
Figure 4:
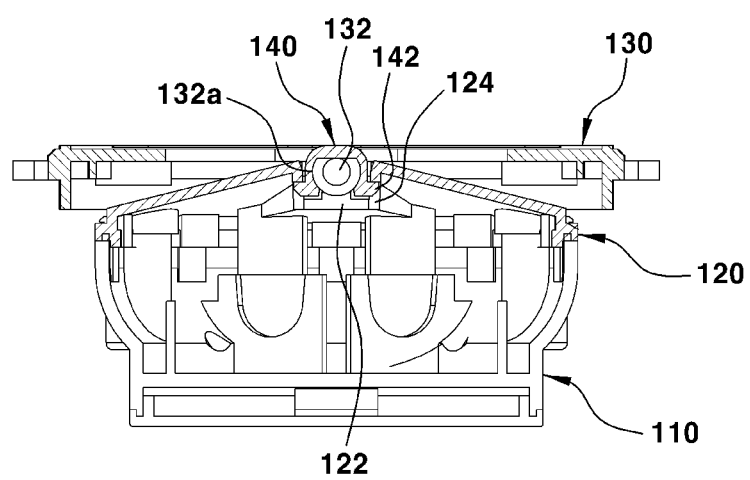
FIG. 4 is a cross-sectional view taken along line A-A of FIG. 3.

More specifically, the rotatable shaft 132 is stacked on the cover rail 122, and the pivot clip 140 is stacked on the rotatable shaft 132, such that the adapter plate 130 is affixed between the pivot clip 140 and the cover rail 122, and the adapter plate 130 has a first degree of freedom (a degree of freedom based on a first axis) so as to be rotatable around the first axis of rotation formed by the rotatable shaft in the leftward and rightward directions (or in the upward and downward directions) (see FIGS. 3A-4). In addition, the clip ribs 142 of the pivot clip 140 are restricted by the guide grooves 124, such that the adapter plate 130 has a second degree of freedom (a degree of freedom based on a second axis) so as to be rotatable around the second axis of rotation formed by the clip ribs in the upward and downward directions (or in the leftward and rightward directions) (see FIGS. 5A-6).

Figure 5A:
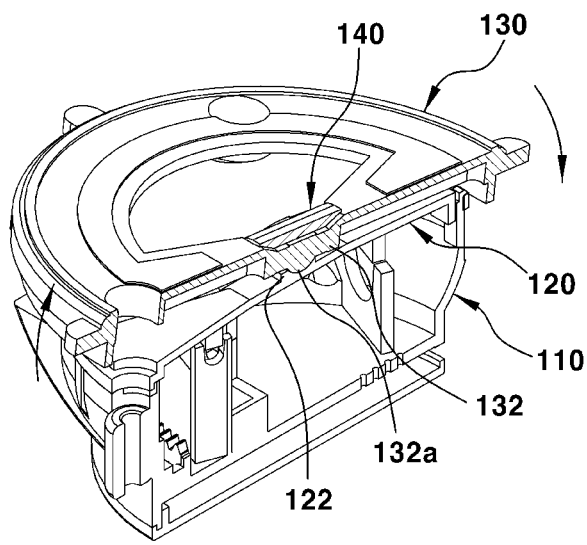
FIGS. 5A and 5B are cut-away perspective views of the mirror actuator according to an exemplary embodiment of the present invention.
Figure 5B:
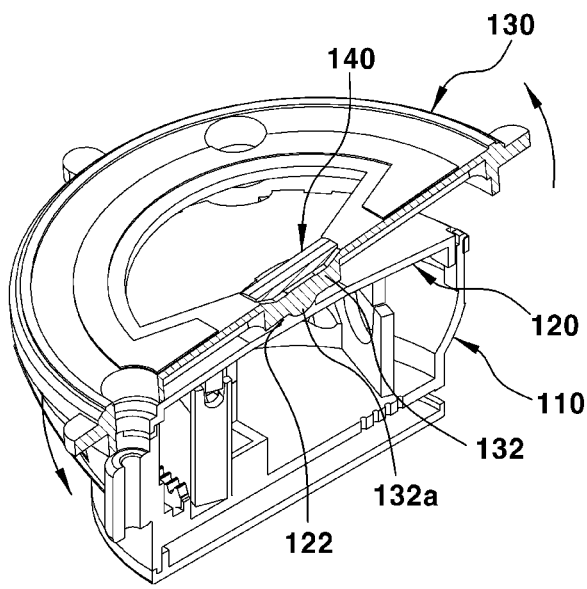
Figure 6:
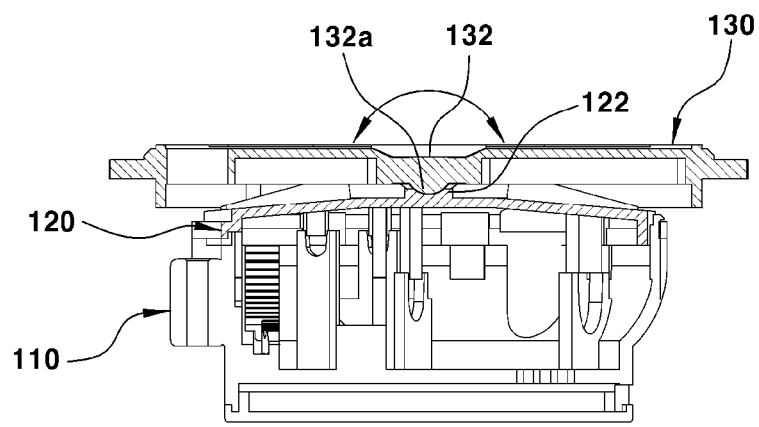
FIG. 6 is a cross-sectional view taken along line B-B of FIG. 5.
Figure 7:
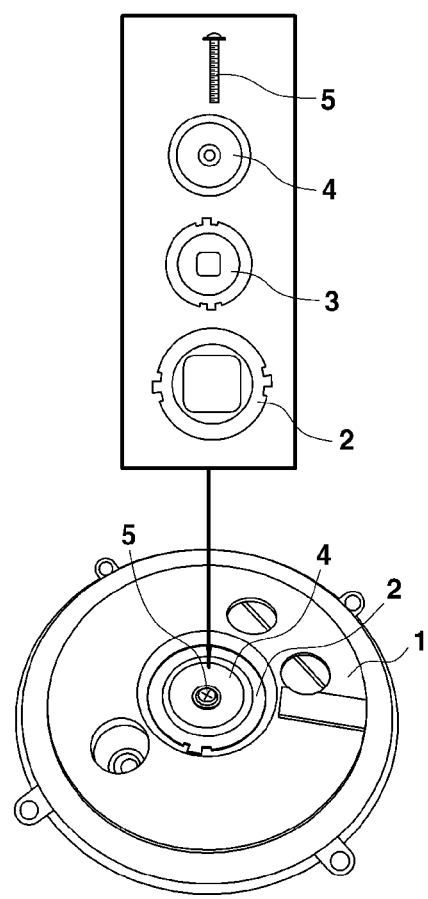
FIG. 7 illustrates an assembled structure of an adapter plate of a mirror actuator in the related art.

Here, as illustrated in FIGS. 3 and 4, the degree of freedom based on the first axis is a degree of freedom at which the adapter plate 130 may be rotated about the rotatable shaft 132. As illustrated in FIGS. 5A-B and 6, the second degree of freedom is based on the second axis is a degree of freedom at which the adapter plate 130 may be rotated about the clip ribs 142 of the pivot clip 140. Further, in certain embodiments a rotation center axis of the degree of freedom based on the first axis and a rotation center axis of the degree of freedom based on the second axis may be orthogonal to each other.

In certain embodiments, the rotatable shaft 132 has a ball-shaped portion 132*a* formed in order to prevent interference with the cover rail 122 when the adapter plate 130 is rotated about the clip ribs 142. In certain embodiments, the ball-shaped portion 132*a* is formed at a substantially central portion of the rotatable shaft 132.

As described above, the adapter plate 130 of the mirror actuator 100 is assembled to the upper side of the housing 110 so as to be rotatable in all directions (in the upward and downward directions, and in the leftward and rightward directions), and may be rotated in all directions (in the upward and downward directions, and in the leftward and rightward directions) by being supplied with power from the motor 112 disposed in the housing 110.

Embodiments of the present invention have been described in detail herein. However, it will be appreciated by those skilled in the art that changes may be made in these embodiments without departing from the principles and spirit of the invention, the scope of which is defined in the appended claims and their equivalents.

What is claimed is:

1. A mirror actuator for a vehicle, comprising:
a housing;
a cover disposed, when the mirror actuator is assembled, at an upper side of the housing, the cover having a cover rail comprising a longitudinally-extending channel recessed within an upper surface thereof, and a pair of guide grooves formed in opposing longitudinally-extending sidewalls of the channel;
an adapter plate comprising a ring-shaped body having a pair of diametrically opposing protrusions protruding from an inner surface of the body towards a center thereof, and a rotatable shaft with opposing ends fixedly connected to the protrusions, and which has a ball-shaped portion at a central portion thereof disposed at the center of the adapter plate, the rotatable shaft being integrated with the adapter plate, wherein, when the mirror actuator is assembled, the rotatable shaft is longitudinally seated within the channel of the cover rail and rotatable around a first axis of rotation formed by the rotatable shaft; and
a pivot clip having clip ribs protruding from two opposite sides of the pivot clip,
wherein, when assembled to the cover, the two opposite sides of the pivot clip surround and rotatably seat on the ball-shaped portion of the rotatable shaft, the clip ribs are inserted into the guide grooves of the cover such that the clip ribs form a second axis of rotation, and the pivot clip is rotatable around the second axis of rotation, surrounds the rotatable shaft, and affixes the adapter plate within the channel of the cover rail,
wherein the first axis of rotation and the second axis of rotation are substantially orthogonal to each other, and
wherein the ball-shaped portion of the rotatable shaft is configured to prevent interference with the cover rail when the adapter plate rotates about the clip ribs.

2. The mirror actuator of claim 1, wherein the cover rail is formed at a central portion of the cover, and the rotatable shaft is formed at a central portion of the adapter plate.

3. A mirror actuator for a vehicle, comprising:
a housing;
a cover disposed, when the mirror actuator is assembled, at an upper side of the housing, the cover having a cover rail comprising a longitudinally-extending channel recessed within an upper surface thereof at a central portion of the cover, and a pair of guide grooves formed in opposing longitudinally-extending sidewalls of the channel;
an adapter plate comprising a ring-shaped body having a pair of diametrically opposing protrusions protruding from an inner surface of the body towards a center thereof, and a rotatable shaft with opposing ends fixedly connected to the protrusions, wherein, when the mirror actuator is assembled, the rotatable shaft is longitudinally seated within the channel of the cover rail and rotatable around a first axis of rotation formed by the rotatable shaft, the rotatable shaft being integrated with the adapter plate at a central portion of the adapter plate; and
a pivot clip having clip ribs protruding downwardly from two opposite sides of the pivot clip,
wherein, when assembled to the cover, the pivot clip is rotatable around a second axis of rotation formed by the clip ribs being inserted into the guide grooves of the cover, the two opposite sides of the pivot clip are rotatably seated on and surround a central portion of the rotatable shaft disposed at the center of the adapter plate, and the pivot clip affixes the adapter plate within the channel of the cover rail, and
wherein the first axis of rotation and the second axis of rotation are substantially orthogonal to each other.

\* \* \* \* \*